(12) United States Patent
Pendlebury (10) Patent No.: US 10,841,552 B2
(45) Date of Patent: Nov. 17, 2020

(54) CHROMA KEYING ILLUMINATION SYSTEM

(71) Applicant: Electro-LuminX Lighting Corporation, Richmond, VA (US)

(72) Inventor: Steven Paul Pendlebury, Richmond, VA (US)

(73) Assignee: Electro-LuminX Lighting Corporation, Richmond, VA (US)

(*) Notice: Subject to any disclaimer, the term of this patent is extended or adjusted under 35 U.S.C. 154(b) by 0 days.

(21) Appl. No.: 16/697,767

(22) Filed: Nov. 27, 2019

(65) Prior Publication Data
US 2020/0186772 A1 Jun. 11, 2020

Related U.S. Application Data

(60) Provisional application No. 62/775,577, filed on Dec. 5, 2018.

(51) Int. Cl.
| | |
|---|---|
| H04N 9/75 | (2006.01) |
| G02B 27/01 | (2006.01) |
| G09B 9/30 | (2006.01) |
| G06T 19/00 | (2011.01) |

(52) U.S. Cl.
CPC ........... *H04N 9/75* (2013.01); *G02B 27/0172* (2013.01); *G06T 19/006* (2013.01); *G09B 9/307* (2013.01)

(58) Field of Classification Search
CPC ........ H04N 9/75; G02B 27/01; G02B 27/017; G02B 27/0172; G02B 2027/0178; G06T 19/006; G09B 9/307
See application file for complete search history.

(56) References Cited

U.S. PATENT DOCUMENTS

| | | | | |
|---|---|---|---|---|
| 8,472,000 | B1* | 6/2013 | Lemmon | G03B 15/06 352/50 |
| 9,995,936 | B1* | 6/2018 | Macannuco | G09B 9/307 |
| 2003/0210228 | A1* | 11/2003 | Ebersole | G06F 3/147 345/157 |
| 2007/0069977 | A1* | 3/2007 | Adderton | H04N 7/181 345/8 |
| 2008/0267523 | A1* | 10/2008 | Shimoyama | H04N 9/75 382/254 |
| 2008/0304737 | A1* | 12/2008 | Kajita | H04N 19/182 382/165 |
| 2010/0026714 | A1* | 2/2010 | Utagawa | G06T 19/006 345/633 |
| 2014/0057229 | A1* | 2/2014 | Groteluschen | G09B 9/46 434/18 |
| 2015/0260474 | A1* | 9/2015 | Rublowsky | A63F 13/213 434/16 |
| 2017/0090851 | A1* | 3/2017 | Takano | G02B 27/0101 |
| 2017/0358136 | A1* | 12/2017 | Gollier | G06F 1/163 |
| 2018/0004002 | A1* | 1/2018 | Rong | G02B 27/283 |
| 2018/0151000 | A1* | 5/2018 | Liv | H04N 5/2224 |

(Continued)

*Primary Examiner* — Tom V Sheng
(74) *Attorney, Agent, or Firm* — John H. Thomas, P.C.

(57) ABSTRACT

A chroma keying system as described herein is a relatively thin and portable system as a result of the deployment of flat light panels such as electroluminescent (EL) lighting panels. By combining a flexible electroluminescent illuminated surface with proper hardware and digital programming, a user wearing a virtual reality (VR) headset is able to see whatever image is programmed for them to see in the headset when looking at specific things or directions.

15 Claims, 7 Drawing Sheets

(56) References Cited

U.S. PATENT DOCUMENTS

| | | | |
|---|---|---|---|
| 2019/0066387 A1* | 2/2019 | Grossmann | G06F 3/017 |
| 2019/0156579 A1* | 5/2019 | Sheftel | G06T 3/0087 |
| 2019/0188914 A1* | 6/2019 | Ogasawara | A63F 13/428 |
| 2019/0230317 A1* | 7/2019 | Sheftel | G06F 3/011 |
| 2019/0279428 A1* | 9/2019 | Mack | A63F 13/211 |
| 2019/0358547 A1* | 11/2019 | Mack | A63F 13/5255 |
| 2019/0369399 A1* | 12/2019 | Cheng | G02B 6/0078 |
| 2020/0118341 A1* | 4/2020 | Ohashi | G02B 27/0172 |
| 2020/0125312 A1* | 4/2020 | Ohashi | G06T 11/00 |
| 2020/0252593 A1* | 8/2020 | Chapdelaine-Couture | H04N 9/75 |

\* cited by examiner

CHROMA KEYING ILLUMINATION SYSTEM

This application claims the benefit of filing of U.S. Provisional Patent Application No. 62/775,577, filed Dec. 5, 2018, which is incorporated by reference herein in its entirety.

This invention relates to a method of creating a chroma keying capable surface with electroluminescent lamps. Specifically, the apparatus and method include a separate backlight section that is integrated into a visual reality chroma keying system.

BACKGROUND

For years, chroma keying technology has been utilized to transform surfaces into a medium to create visual effects that appear to be one thing, but in reality, are something different. By utilizing chroma keying technology, it is possible to transform any surface through the process by which a specific color element (chroma) is removed from a video scene and replaced (keyed) with a different element. One can then remove the colored background and replace it with another. The color is typically bright green or bright blue, because these hues differ so greatly from human skin tones and are not commonly used in everyday fabrics. Traditionally the medium to make the chroma keying technology possible is a green surface, usually a fabric or carpet, that is generally illuminated from the front and not behind.

One popular example of chroma keying is the local television news weather map. An image of the weather map is projected on a green screen behind a live person standing in front of the screen. Most chroma keying systems used currently, such as the local news weather man, are front lit, and a big projection light shines on a green drape. Backlighting may alternatively or also be used, but backlighting is not normally done unless there is a big room to accommodate the backlit system.

In order to be most effective, an illuminated surface requires even lighting. Dark or cold spots in the lighting may result in shadows or poor resolution of projected images. As a result, multiple lights and light diffusers are traditionally required to make a surface emit a relatively even light color.

SUMMARY

Accordingly, it is an object of the present invention to overcome shortcomings in existing chroma keying systems and to use such systems in combination with a virtual reality headset to improve visual experiences.

In one example, a chroma keying illumination system comprises a flat light panel that comprises a surface that emits light from a light source that is in the shape of the light panel, wherein the light emitted from the light panel is a predetermined color hue. The system also includes a virtual reality headset, wherein the virtual reality headset is connected to a processor that includes video in its memory, and further wherein the virtual reality headset detects the predetermined color hue and replaces that color hue with video/content/images from its memory. The video from the memory will be varied in a predetermined perspective depending on the location and orientation of the virtual reality headset, whereby a user wearing the virtual reality headset may view predetermined video on the light panel. The flat light panel may be an electroluminescent light panel. The system may include a plurality of electroluminescent light panels that each emit the predetermined color hue. The system may also include an interactive object proximate the electroluminescent light panel, wherein the user can interact with the object and see the object through the virtual reality headset in a field of view of the predetermined video projected in the virtual reality headset. The system may comprise a plurality of electroluminescent light panels that each emit the predetermined color hue, and further wherein the light panels replicate walls and form a space at least 180 degrees around the user. The light panels may replicate walls and form a space at least 270 degrees around the user. The electroluminescent panel may be mounted on the floor where the user can walk on and around it. At least one of the electroluminescent panels may be mounted on the floor where the user can walk on and around it. The predetermined color hue emitted by the light panel may be blue or green. The electroluminescent light panel may be flexible and form a curved surface. The system may further comprise a variable power control of the electroluminescent light panel to allow variation of the brightness of the light emitted. The system may be set up inside a flight simulator cockpit, and wherein the electroluminescent light panels are shaped to cover one or more of the windows in the cockpit. The system may alternatively be set up inside a vehicle, and wherein the panels are shaped to cover one or more of the windows in the vehicle. The vehicle may be mounted on a drive simulator. The system could also just be a room with lighting on the walls and that room could be turned into any simulated environment for training.

DETAILED DESCRIPTION

A chroma keying system as described herein is a relatively thin and portable system as a result of the deployment of flat light panels such as electroluminescent (EL) lighting panels. For the chroma keying effect to work best when using a particular color screen surface, the screen must be evenly lit, with no dark spots or visual shadows. In one example, flexible electroluminescent lamps are able to accomplish even lighting as the entire EL light source surface illuminates, versus a traditional edge or backlit solution with uneven illumination. Chroma keying for live feeds requires hardware that can recognize and manipulate multiple video channels. This allows for dynamic feedback creating a virtual reality experience. Once a light source is the identified by the hardware, just about anything a person can imagine can be projected onto that surface, while the sections of the surface that aren't illuminated remain unaffected. This allows for controls and levers to be present inside the virtual world and used as normal but in virtual conditions. By combining a flexible electroluminescent illuminated surface with proper hardware and digital programming, a user wearing a virtual reality (VR) headset is able to see whatever image is programmed for them to see in the headset when looking at specific things or directions that are illuminated. It is also possible to see other people in the same virtual world, which allows multiple people to train at the same time together.

Conventional chroma keying systems are used just as backgrounds to objects or surfaces. However, with flat light panels such as electroluminescent lighting, it is possible to create specially illuminated surfaces that match any form factor and can then be utilized to create special effects. For example, it is possible to convert a window inside a room or vehicle into an illuminated surface. Combined with chroma keying technology, that surface can now be infinitely simulated to be almost any visual scene. The user can 'look' out the window using a VR headset and see whatever is programmed for them to see. Conversely, the user is able to see and feel and use other objects in the room or vehicle that are not illuminated in the specific color hue associated with the chroma key technology.

With the combination of chroma keying technology and a VR headset, an illuminated room can be created and real-world equipment can be installed inside. A user wearing a VR headset can see other people in the room and the real equipment in the room as well as the virtual world projected solely on the chroma key background. In another example, users wearing VR headsets can drive a vehicle into the room with EL panel walls, and the VR-wearing passengers in the vehicle can look out their window to a virtual world. A further example of a vehicle includes a vehicle placed or mounted onto a drive simulator surface and with the windows covered with flat light panels so that driving the vehicle in preprogrammed scenarios may be simulated.

Still further alternatively, the flexible electroluminescent panels, or other flexible flat light panels, provide a way in which it is possible to put the color key technology into any form factor that can be imagined. The ability to cut flexible EL sheets into any shape makes it possible to custom make illuminated panels or inserts to fit any shape. For example, one could convert all the windows inside a particular vehicle or plane. Utilizing CAD or other dimensional drawings, one can cut the flexible EL sheet to that exact shape. The electroluminescent panels can then be sent to the end user and installed by a variety of methods in-situ, for instance utilizing an end user's existing vehicle versus having to build a model of the same structure.

The ability to cut flexible EL sheet into any size and shape allows the light source to be placed virtually anywhere. One can recreate the front dome of an aircraft used today in flight simulators. Since there is no need for light diffusion as in most chroma key apparatuses, it is not necessary to build huge complicated light boxes to surround the flight simulator dome with the sole purpose to diffuse the cast light to be even. The use of EL sheets or other flexible flat light panels results in a lighting foot print that is in some examples $\frac{1}{10}$ or smaller the foot print size of an equivalent backlit system. An average EL panel can be less than a credit card in total thickness.

In addition to reducing the lighting hardware foot print, use of EL lighting reduces for instance the number of cameras utilized in a traditional flight simulator. EL lighting can also reduce the cost of ownership of a domed flight simulator solution as projectors are not needed, replacing the bulbs on the projectors is not needed, and it is not necessary to remove the heat produced by the projectors. Keeping flight simulator domes clean is also a challenge. The channel count for video is reduced significantly. Compared to a known dome system called MCAT which uses 38 projectors and 43 channels, with electroluminescent panels, a system as described herein only needs the IOS and the individual head mounted devices (HMD) channels. This is a major cost savings.

With a virtual reality HMD and the cameras, the user gets to see the real world in real time. Plus, it provides a stereoscopic and dynamic view point that cannot be accomplished with a dome. The fidelity also gets better, which refers to the ability of a process to render an image accurately, without any visible distortion or information loss, thereby making the experience seem more realistic.

Flexible EL panels or other flexible light panels can also be configured into standard parts that can be assembled to form structures. The parts would be constructed in a way that when assembled, they form a perfect wall of light with no shadows, dark spots or break in light. EL panels illuminate 100% edge to edge, which enables panels to be placed side by side without any dark edges. Most other technologies do not illuminate 100% from edge to edge. With conventional systems, in order to form large areas requires framing to hold a diffusing surface which the frame blocks back light to the diffusing surface where diffuser is held, versus EL where the surface actually lights and there is no need for diffusion, the framing just holds the light panels in place.

The standard EL panel parts could have a base making them free standing. This would allow them to be configured to form hallways or rooms, including floors, that can be easily rearranged into any basic shape or dimension. Such methods are ideal for creating training environments for first responders, law enforcement or military. Virtual worlds can be created for virtually infinite modeling simulations.

EL sheets can also be placed on the ceiling or floor to immerse the user into a full 360 degree, three-dimensional experience. EL sheets are a solid state lighting system with no filaments, gas or glass to break. They generally include, but are not limited to, a transparent front electrode layer, a phosphor layer, a dielectric layer, and a rear electrode. a variety of other EL structures may also be used. As discussed herein, an EL sheet may be in the form of a flexible panel with a multilayer inner cell sealed in an outer moisture resistant envelope. The EL sheets produce no heat and are very resistant to impact. The flexibility of the system allows any surface of structure to be 100% evenly illuminated. An entire surface or just specific areas can be isolated depending on the goal of the system. An EL surface can also have holes cut out to allow for objects to poke through. The EL sheets may also have a matte finish on the outside lamination, which will reduce gloss and subsequent glare that can interfere with the VR headsets. Additionally, the color hue emitted from an EL panel is determined by the specific phosphor used in an EL panel and the electrical current applied to the EL sheet. The hues may be different color temperatures, or alternatively, may be varied by increasing or decreasing the current applied to the EL sheet, thereby affecting brightness. In this way, the traditional chroma key green or blue screens may be created, although other colors are of course possible.

The EL panels can be controlled via DMX or 0-10 dimming, which enables each light source to be individually controlled. This allows the system to tune each light source to be equal to each other but also allows for dynamic tuning. For example, Light Tape 0 electroluminescent panels can also be utilized for night vision exercises. The system can be dimmed and accomplished with special digital filters. The DMX, 0-10 VDC and other digital interfaces that can be added to the EL panel power supplies allow for individual control of each individual EL panel part. This allows an EL panel system to be integrated in almost any standard control system/interface.

Accordingly, it is an object of the present invention to overcome the drawbacks of front lit or backlight chroma keying or 'green screen' technology. The use of electroluminescent panels delivers a dynamic chroma keying system that allows a user to have a virtual reality experience. The ability to convert any space or shape into an even backlight allows the use of chroma technology to achieve another level of simulation. With the use of head mounted display in conjunction with supporting software, users can enter a virtual world that is ideal for simulating any experience.

Additional disclosure regarding specific EL lighting systems and applications, including structures and methods that may be used in the present chroma keying systems, are set forth in U.S. Pat. No. 7,582,000, issued Sep. 1, 2009; U.S. Pat. No. 8,844,179, issued Sep. 30, 2014; and U.S. Pat. No. 10,215,370, issued Feb. 26, 2019, the contents of each of which are incorporated herein by reference in their entirety.

The examples herein are concerned primarily with EL sheets and panels. It is believed that other thin lighting systems including those based on light-emitting diodes (LED) and liquid crystal display (LCD) technologies could also be deployed in a chroma keying, color panel structure. With flat light panel arrangements, these technologies could be used similarly with EL panels. And to the extent that there are flexible LED and LCD technologies, then they may also be applied to more complex 3D shapes like the EL panels already discussed herein. For the purposes of the present invention, the terms "flat light panels" refers to thin profile EL, LED and LCD technologies. This "thin profile" means a light panel that is ⅛ to three inches in cross-sectional thickness, or alternatively ¼ to two inches in thickness, or still further alternatively less than one inch, or less than two inches, or less than three inches in thickness.

Figure 1A:
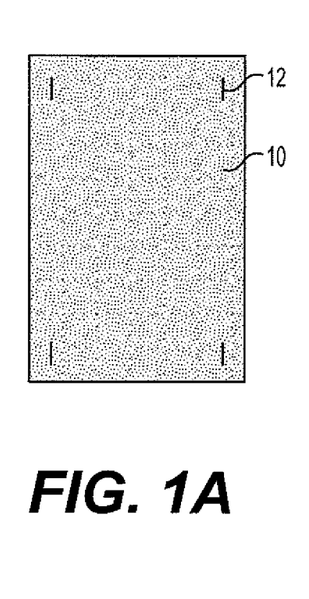
FIGS. 1A-1C are perspective views of a rectangular flat light panel, a curved light panel, and circular light panel respectively.
Figure 1B:
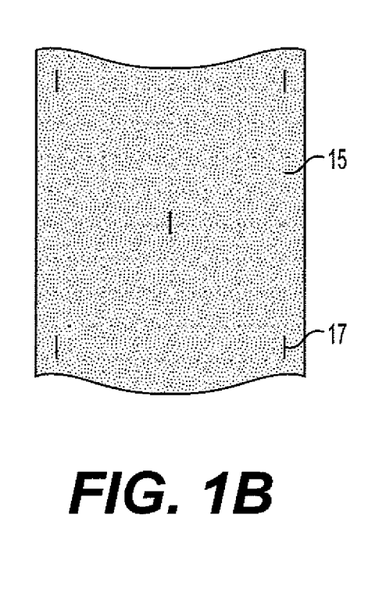
Figure 1C:
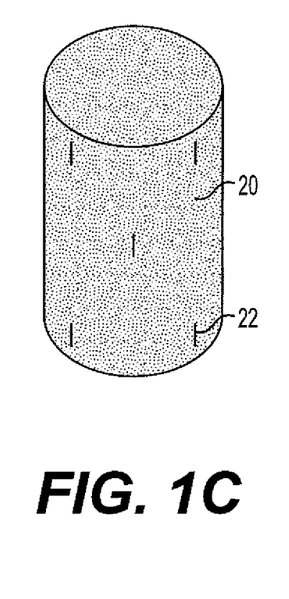

Turning now to the figures, FIGS. 1A-1C illustrate the different types of format for the flat light panels disclosed herein. FIG. 1A is a rectangular, flat light panel 10. The light panel 10 is shown with adhesive or hook and loop fastener strips 12 in the corners thereof. Double-sided tape or glue could of course be used as well. The fastener strips 12 may be used in connection with a frame or structure to mount the flat light panel 10 onto the frame. FIG. 1B illustrates a curved, flat panel 15. This curved, flat panel also has fastener strips 17 thereon. FIG. 1C illustrates a round, flat panel 20 having fastener strips 22 thereon. In use, fastener strips like fastener strips 12, 17 and 22 will be attached to the back surface of the flat light panels so that the designated front surface would be a uniform light source. As already discussed, these flat light panels 10, 15, and 20 may be electroluminescent panels, LCD panels, LED panels or other thin profile light sources. Also, the particular shapes of the light panels 10, 15, and 20 as shown are merely exemplary in nature. The flat light panels may be other symmetrical or asymmetrical shapes, including but not limited to, square, round, trapezoidal, and oval among others.

Figure 2:
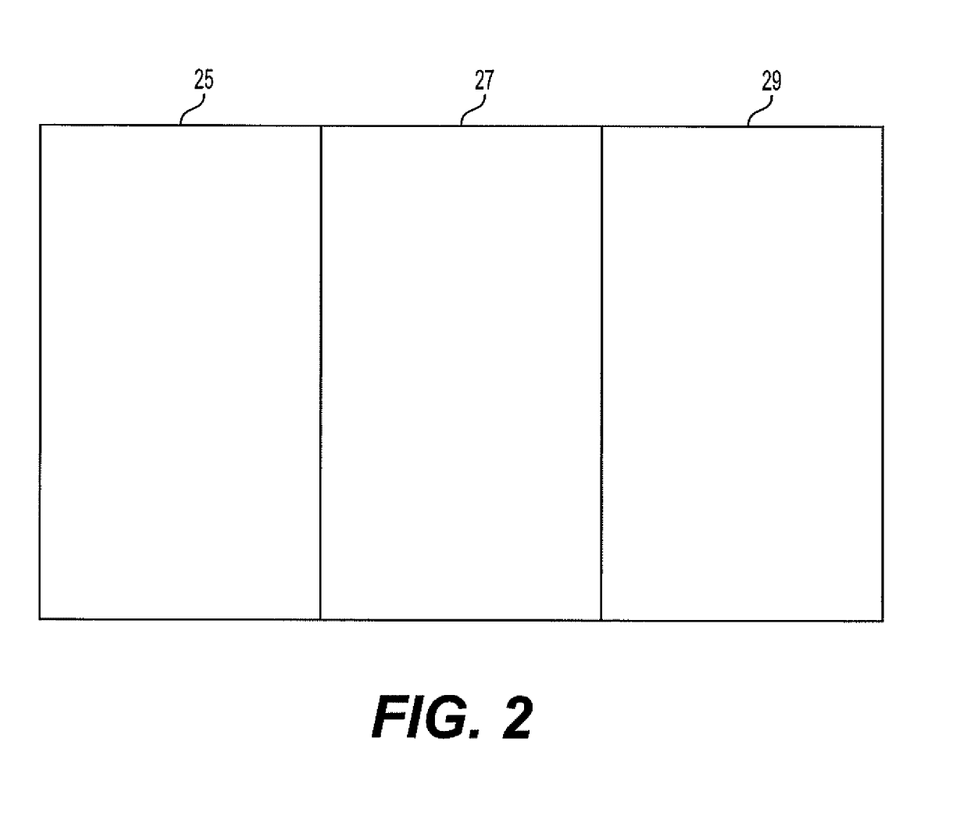
FIG. 2 is a front view of a set of three adjacent flat light panels as described herein, aligned side by side to create a large area with no break or gap in light.

FIG. 2 is an array of three flat light panels 25, 27 and 29 mounted adjacent each other. These flat light panels 25, 27 and 29 are each the same height, and as shown, they have the same widths. The light panels 25, 27 and 29 may be replication a wall in a simulated room or they may simply be a large wall of light to provide a more panoramic view to a person watching video on the wall through a VR headset. The flat light panels may alternatively be different widths and heights and even shapes so that they may be assembled to create different shape and size structures.

Figure 3:
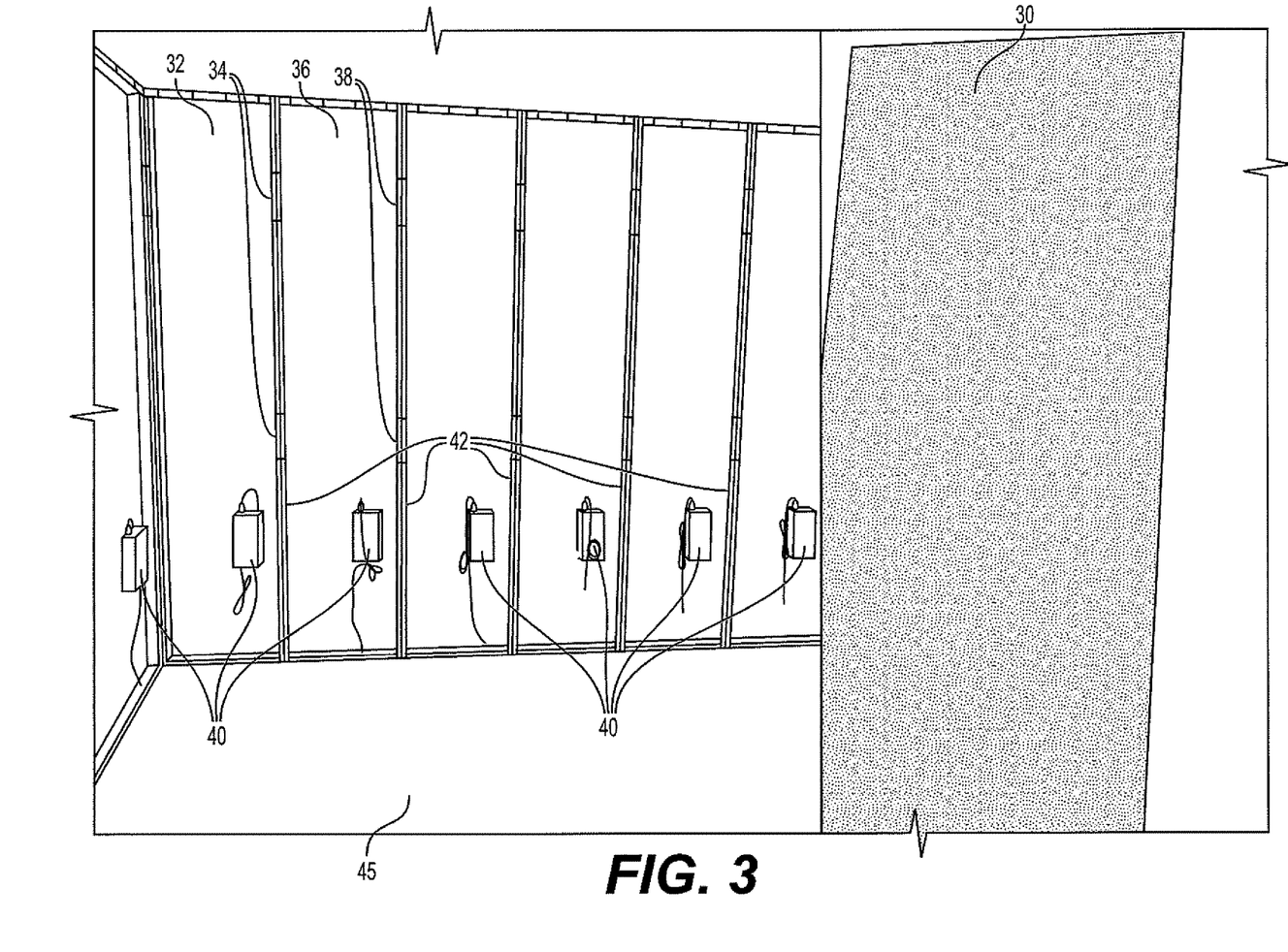
FIG. 3 is a perspective view of an example of framing and power sources for a group of rectangular electroluminescent light panels.

FIG. 3 is a perspective view of a room being assembled to include, in this example, electroluminescent panels on the walls and possibly floor of the room. Flat light panel 30 is waiting to be mounted onto a frame 42 having hook and loop fastener strips 34 and 38 adhered thereto. The EL panel 30 may be mounted onto space 32 or 36 for example using hook and loop fasteners on the back to the EL panel, not shown (but see FIGS. 1A-C). Power sources 40 will be electrically connected to flat light panels such as EL panel 30 to control the activation of lighting of the panel. The framework 42 is similar to if not exactly sized as a 2×4 stud for the temporary wall. In addition to the vertical wall spaces 32 and 36, for instance, the floor 45 may also be formed of EL light panels. EL panels may be mounted onto other substrates than just a frame including onto an existing wall or other structure.

Figure 4:
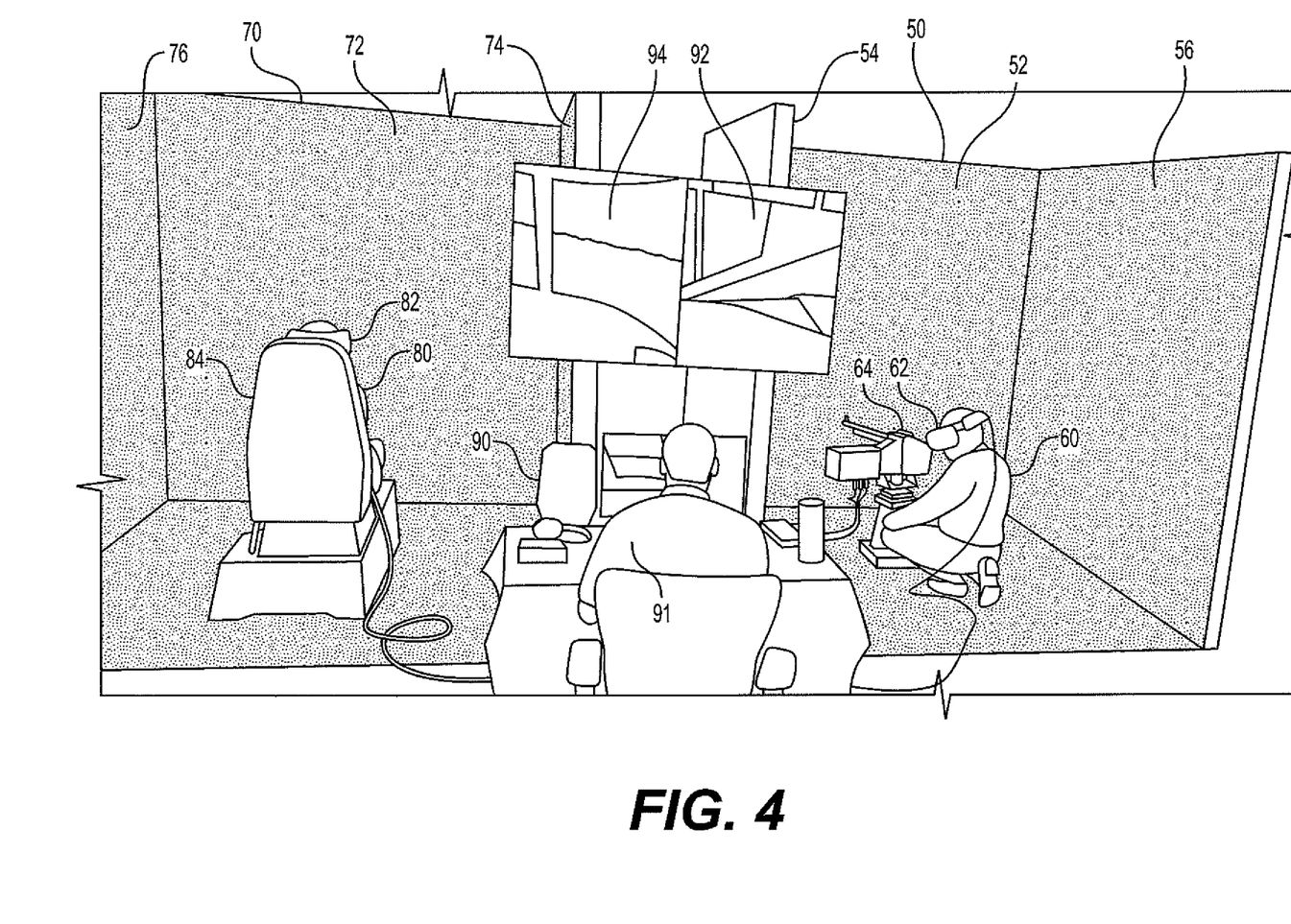
FIG. 4 is a perspective view of a split room, helicopter simulator where the pilot and gunner are sitting in separate rooms surrounded by electroluminescent light panels.

FIG. 4 illustrates split rooms 50 and 70 in a helicopter gunship simulator. The gunner room 50 is formed of three walls 52, 54, and 56 that surround three sides of a gunner 60. The gunner 60 is seated behind a simulated gun 64. The gunner 60 is wearing a VR headset 62. The simulated pilot room 70 is surrounded by three walls 72, 74 and 76 on three sides of the pilot. The pilot 80 is seated in a pilot seat 84. Pilot controls would be in front of the pilot 80 as they would be in a real helicopter cockpit, but they are not seen in this view. The pilot 80 is wearing a VR headset 82. The gun 64 and pilot controls (not shown) are inanimate objects that simulate real equipment that the pilot 80 and gunner 60 would use in a helicopter. Both pilot 80 and gunner 60 can see each other in the simulated world, e.g., the pilot can look back in the helicopter and see his gunner. Seated behind and in between the rooms 50 and 70 is a person 91 who is operating the computer processor 90. The processor 90 has predetermined video stored therein. The walls 52, 54 and 56 in room 50, and the walls 72, 74 and 76 in room 70 are each formed of flat light panels, in this example electroluminescent light panels. The support structure behind the rooms 50 and 70 is similar to that shown in FIG. 3. In this figure, the walls are all blank with nothing visible on them beyond their light. However, the VR headsets 62 and 82, using chroma keying technology, picks up the light from the walls 52, 54, 56, 72, 74, and 76, and replaces that preset color hue with video stored in the computer processor 90. Just above the person 91 there is a split monitor or two screens 92 and 94 that display the video that the users 60 and 80 see through their VR headsets 62 and 82, thereby simulating a realistic helicopter flight across dangerous territory. The visual pictures 92 and 94 will move and be varied depending on how the users 60 and 80 move their heads and operate the gun 64 and pilot controls (not shown) or other inanimate objects in their proximity to try to realistically reproduce the flight experience.

Figure 5:
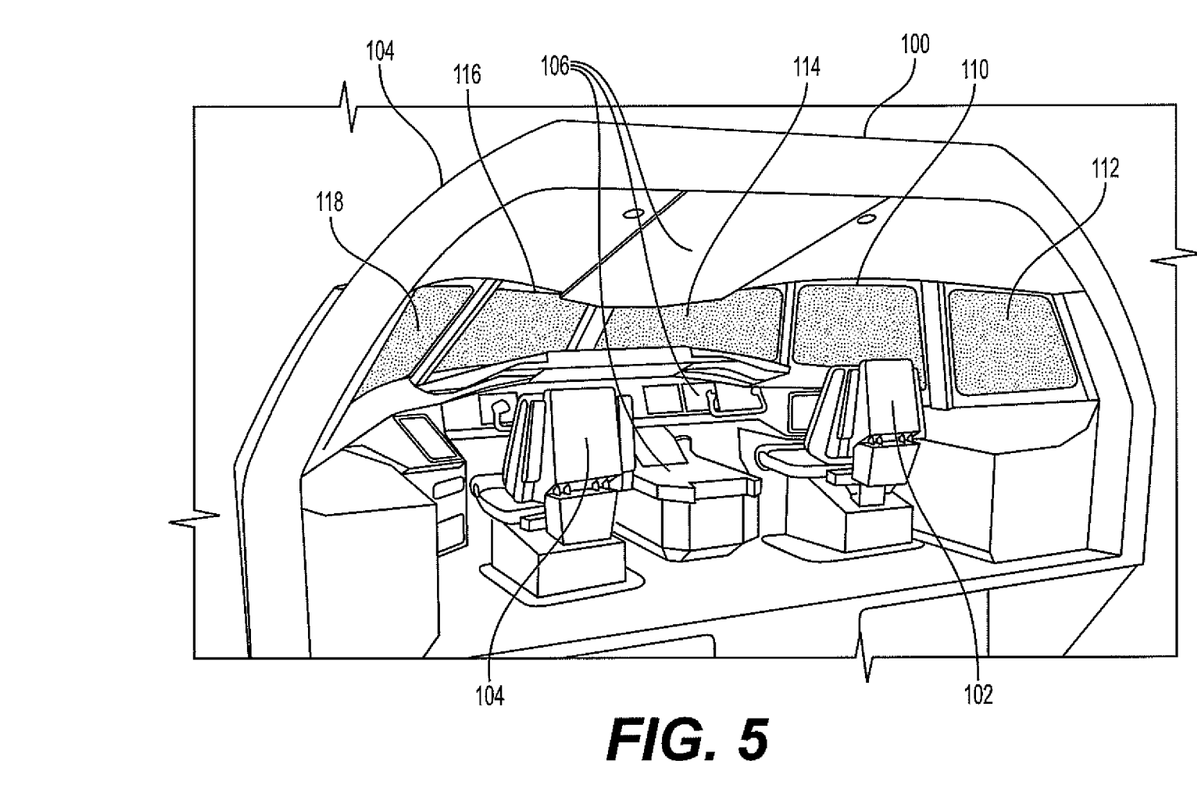
FIG. 5 is a perspective view of a flight simulator where the simulator cockpit windows are covered by electroluminescent light panels.

FIG. 5 is a perspective, back view of a jet flight simulator 100. The simulator 100 includes pilot seats 102 (copilot) and 104 (pilot). The simulator 100 also includes airplane flight control equipment and gauges 106 in front of and above the pilot seats 102 and 104. The windows 110, 112, 114, 114, 116 and 118 are all reproductions of real pilot cabin windows to simulate the true pilot flight experience. In this case, however, the windows 110, 112, 114, 116, and 118 are all flat light panels cut out in the shape of and either replacing or mounted onto the windows. These flat light panels 110, 112, 114, 116 and 118 are all controlled to emit light at predetermined hues such as blue or green. Pilots who sit in the seats 102 and 104 will wear VR headsets connected to a computer that has video stored in it. The pilots would then see, via chroma key technology, the predetermined video on the windows 110, 112, 114, 116, and 118. The view in the windows will vary depending on pilot actions with the controls and gauges 106 to deliver a realistic flying experience.

Figure 6:
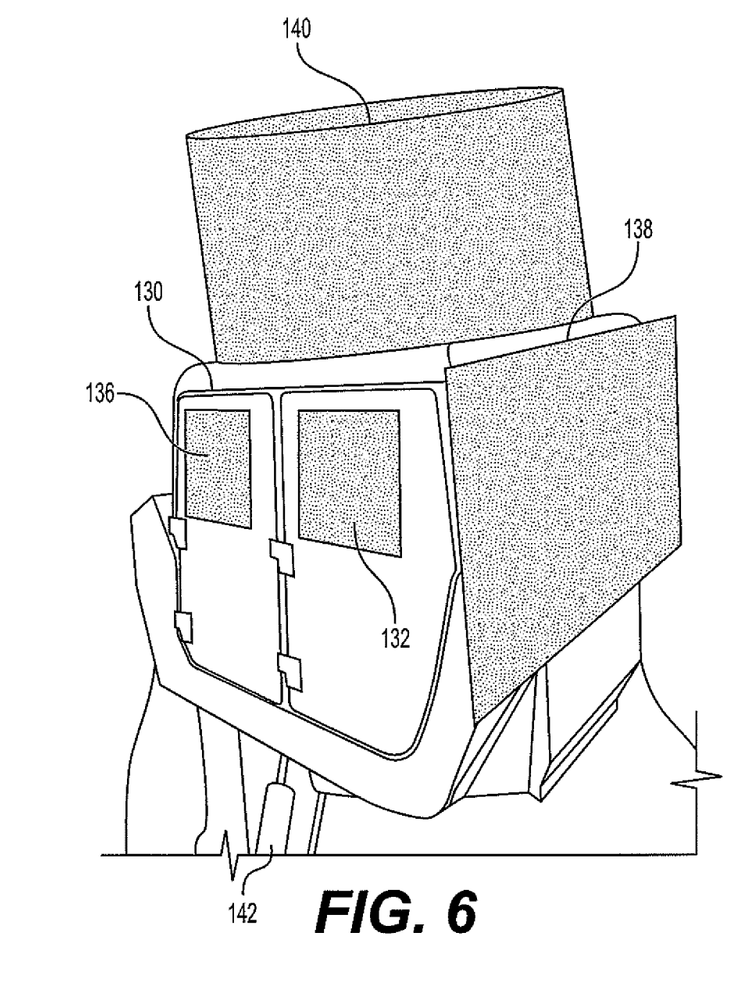
FIG. 6 is a perspective view of a military vehicle simulator with electroluminescent light panels covering the vehicle windows and gunner roof mount.

FIG. 6 is a military vehicle simulator 130 as seen from outside the vehicle. The military vehicle simulator 130 is sized and looks like an actual vehicle, and users will be seated inside as they would be in a real vehicle with all of their controls and weapons inside. FIG. 6 shows the vehicle 130 with side windows 132 and 136 and a rear window 138. Of course there would also be a front windshield and windows on the opposite side of the vehicle 130. Each of the windows 132, 136 and 138 is replaced or covered by a flat light panel that will emit into the vehicle a predetermined light hue. The operator and occupants of the vehicle will wear VR headsets that are programmed to work with the light panels 132, 136 and 138 (and other light panels covering the additional windows. A predetermined video is stored in a computer that is also operatively connected to the VR headsets so that the driver and occupants will see a realistic video experience. The vehicle simulator 130 also has a turret that is surrounded by a tubular flat light panel 140. Therefore, the turret gunner, while wearing a VR headset, will also be delivered a simulated visual experience. The vehicle simulator 130 is mounted onto a fixed drive simulator 142 that gives the occupants a realistic experience inside the simulated vehicle.

Figure 7:
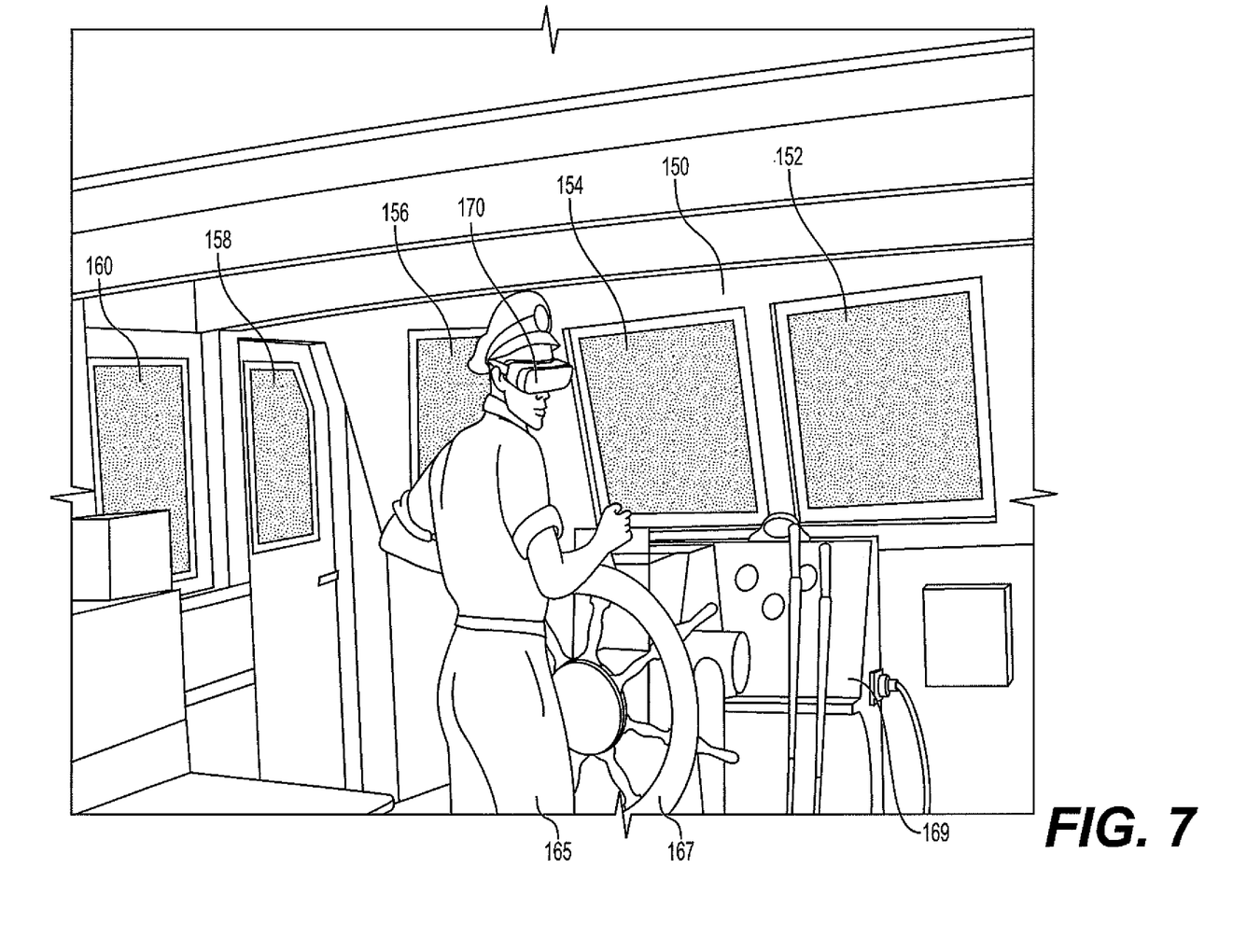
FIG. 7 is a perspective view of a naval vessel cockpit where the windows are covered with electroluminescent light panels.

Finally, FIG. 7 illustrates a navy ship simulator 150. This example illustrates the flexibility of the system described herein in that any ship cockpit can be adapted for use with the system. All that is required is that the cockpit windows such as windows 152, 154, 156, 158, and 160 will be covered by a flat light panel that displays a predetermined hue. The ship pilot 165 would wear a VR headset to operate the ship wheel 167 and control panel 169. Instead of looking outside the windows 152, 154, 156, 158, and 160, the pilot 165 would see predetermined video via chroma key technology that would simulate the actual ship 150 operation.

Multiple simulations are shown in the figures, however, additional simulations are possible. Other applications may include, but are not limited to, aircraft control towers, chemical plant control rooms or any other command control room. All that is required is the flat light panels, a VR headset, and a predetermined video/content/images connected to the VR headset that is visible on the flat light panels via chroma key technology.

While the invention has been described with reference to specific embodiments thereof, it will be understood that numerous variations, modifications and additional embodiments are possible, and all such variations, modifications, and embodiments are to be regarded as being within the spirit and scope of the invention.

That which is claimed is:

1. A chroma keying illumination system comprising:
    a flat light panel that comprises a surface that emits light from a light source that is in the shape of the light panel, wherein the light emitting from the light panel is a predetermined color hue,
    a virtual reality headset, wherein the virtual reality headset is connected to a processor that includes video in its memory, and further wherein the virtual reality headset detects the predetermined color hue and replaces that color hue with video from its memory,
    still further wherein video from the memory will be varied in a predetermined perspective depending on the location and orientation of the virtual reality headset,
    whereby a user wearing the virtual reality headset may view predetermined video on the light panel.

2. A chroma keying illumination system as described in claim 1,
    wherein the flat light panel is an electroluminescent light panel.

3. A chroma keying illumination system as described in claim 2, further comprising,
    a plurality of electroluminescent light panels that each emit the predetermined color hue.

4. A chroma keying illumination system as described in claim 3,
    wherein the system is set up inside a flight simulator cockpit, and wherein the electroluminescent light panels are shaped to cover one or more of the windows in the cockpit.

5. A chroma keying illumination system as described in claim 3,
    wherein the system is set up inside a vehicle, and wherein the panels are shaped to cover one or more of the windows in the vehicle.

6. A chroma keying illumination system as described in claim 5,
    wherein the vehicle is mounted on a drive simulator.

7. A chroma keying illumination system as described in claim 2, further comprising,
    an interactive object proximate the electroluminescent light panel, wherein the user can interact with the object and see the object through the virtual reality headset in a field of view of the predetermined video projected in the virtual reality headset.

8. A chroma keying illumination system as described in claim 2, further comprising,
    a plurality of electroluminescent light panels that each emit the predetermined color hue, and further wherein the light panels replicate walls and form a space at least 180 degrees around the user.

9. A chroma keying illumination system as described in claim 8,
    wherein the light panels replicate walls and form a space at least 270 degrees around the user.

10. A chroma keying illumination system as described in claim 9,
    wherein at least one of the electroluminescent panels is mounted on the floor where the user can walk on and around it.

11. A chroma keying illumination system as described in claim 2,
    wherein the electroluminescent panel is mounted on the floor where the user can walk on and around it.

12. A chroma keying illumination system as described in claim 2,
    wherein the electroluminescent light panel is flexible and forms a curved surface.

13. A chroma keying illumination system as described in claim 2,
    wherein the system further comprises a variable power control of the electroluminescent light panel to allow variation of the brightness of the light emitted.

14. A chroma keying illumination system as described in claim 1,
   wherein the predetermined color hue emitted by the light panel is blue.

15. A chroma keying illumination system as described in claim 1,
   wherein the predetermined color hue emitted by the light panel is green.

* * * * *